(12) United States Patent
Yoshida et al.

(10) Patent No.: US 9,257,700 B2
(45) Date of Patent: Feb. 9, 2016

(54) ELECTRODE, NONAQUEOUS ELECTROLYTE BATTERY AND BATTERY PACK

(71) Applicant: KABUSHIKI KAISHA TOSHIBA, Minato-ku (JP)

(72) Inventors: Yorikazu Yoshida, Yokohama (JP); Kazuhiro Yasuda, Yokohama (JP); Takashi Kishi, Yokosuka (JP); Hiroki Inagaki, Yokohama (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 59 days.

(21) Appl. No.: 14/175,355

(22) Filed: Feb. 7, 2014

(65) Prior Publication Data
US 2014/0220416 A1 Aug. 7, 2014

(30) Foreign Application Priority Data
Feb. 7, 2013 (JP) .................................. 2013-022212

(51) Int. Cl.
*H01M 4/485* (2010.01)
*H01M 4/48* (2010.01)
*H01M 4/131* (2010.01)
(Continued)

(52) U.S. Cl.
CPC ................. *H01M 4/485* (2013.01); *B60L 1/02* (2013.01); *B60L 3/0046* (2013.01); *B60L 3/04* (2013.01); *B60L 11/1805* (2013.01); *B60L 11/1859* (2013.01); *B60L 11/1864* (2013.01); *B60L 11/1874* (2013.01); *B60L 11/1875* (2013.01); *B60L 11/1879* (2013.01); *H01M 4/131* (2013.01); *H01M 4/366* (2013.01); *B60L 2200/12* (2013.01); *B60L 2240/545* (2013.01); *B60L 2240/549* (2013.01); *H01M 10/0525* (2013.01); *H01M 2004/021* (2013.01); *H01M 2200/10* (2013.01); *H01M 2220/20* (2013.01); *Y02E 60/122* (2013.01); *Y02T 10/7005* (2013.01); *Y02T 10/7011* (2013.01)

(58) Field of Classification Search
None
See application file for complete search history.

(56) References Cited

U.S. PATENT DOCUMENTS

2006/0093916 A1 5/2006 Howard et al.
2006/0093917 A1 5/2006 Howard et al.
(Continued)

FOREIGN PATENT DOCUMENTS

CN 1893167 A 1/2007
JP 2009-81049 4/2009
(Continued)

OTHER PUBLICATIONS

Extended European Search Report issued May 13, 2014 in Patent Application No. 14154102.9.
(Continued)

*Primary Examiner* — Cynthia K Walls
(74) *Attorney, Agent, or Firm* — Oblon, McClelland, Maier & Neustadt, L.L.P.

(57) ABSTRACT

According to one embodiment, an electrode includes a current collector and an active material-including layer. The active material-including layer includes a first layer and a second layer. The first layer is provided on a surface of the current collector and includes lithium titanium oxide having a spinel structure. The second layer is provided on the first layer and includes a monoclinic β-type titanium composite oxide.

18 Claims, 9 Drawing Sheets

(51) Int. Cl.
*H01M 4/36* (2006.01)
*B60L 3/00* (2006.01)
*B60L 3/04* (2006.01)
*B60L 11/18* (2006.01)
*B60L 1/02* (2006.01)
*H01M 10/0525* (2010.01)
*H01M 4/02* (2006.01)

(56) References Cited

U.S. PATENT DOCUMENTS

| | | |
|---|---|---|
| 2007/0009801 A1 | 1/2007 | Inagaki et al. |
| 2009/0081551 A1* | 3/2009 | Hoshina et al. .......... 429/231.95 |
| 2009/0208845 A1 | 8/2009 | Howard et al. |
| 2010/0119936 A1 | 5/2010 | Inagaki et al. |
| 2010/0239908 A1 | 9/2010 | Howard et al. |
| 2011/0020699 A1 | 1/2011 | Inagaki et al. |
| 2011/0183210 A1 | 7/2011 | Howard et al. |
| 2011/0229758 A1 | 9/2011 | Inagaki et al. |
| 2012/0003531 A1 | 1/2012 | Howard et al. |
| 2012/0009472 A1 | 1/2012 | Yokoi et al. |
| 2012/0070726 A1 | 3/2012 | Hoshina et al. |
| 2012/0077074 A1 | 3/2012 | Hoshina et al. |
| 2012/0141871 A1 | 6/2012 | Inagaki et al. |
| 2012/0308880 A1 | 12/2012 | Duh et al. |
| 2012/0328930 A1 | 12/2012 | Inagaki et al. |
| 2013/0040187 A1 | 2/2013 | Inagaki et al. |
| 2013/0273417 A1 | 10/2013 | Inagaki et al. |

FOREIGN PATENT DOCUMENTS

| | | |
|---|---|---|
| WO | WO 2006/050099 A1 | 5/2006 |
| WO | WO 2012/147854 A1 | 11/2012 |

OTHER PUBLICATIONS

Graham Armstrong, et al., "TiO$_2$(B) Nanotubes as Negative Electrodes for Rechargeable Lithium Batteries", Electrochemical and Solid-State Letters, 9 (3), 2006, 5 pages.

Office Action issued Jul. 16, 2015 in European Patent Application No. 14 154 102.9.

Office Action issued Sep. 24, 2015, in corresponding Chinese Patent Application No. 201410044830.4 (with English-language Translation).

\* cited by examiner

ELECTRODE, NONAQUEOUS ELECTROLYTE BATTERY AND BATTERY PACK

CROSS-REFERENCE TO RELATED APPLICATIONS

This application is based upon and claims the benefit of priority from Japanese Patent Application No. 2013-022212, filed Feb. 7, 2013, the entire contents of which are incorporated herein by reference.

FIELD

Embodiments described herein relate generally to an electrode, nonaqueous electrolyte battery and battery pack.

BACKGROUND

Lithium titanium oxide having a spinel structure ($Li_4Ti_5O_{12}$), which is in actual use, has three lithium ions capable of absorbing and releasing per unit chemical formula. For this reason, the number of lithium ions capable of absorbing and releasing is 3/5 per titanium ion; that is, 0.6 is theoretically the maximum value. Such a lithium titanium oxide having a spinel structure has a theoretical capacity of about 170 mAh/g.

Recently, titanium oxide having a monoclinic β-type structure has been drawing attention as a negative electrode material having a high capacity. In the titanium oxide having a monoclinic β-type structure, the number of lithium ions capable of absorbing and releasing is 1.0 at most per titanium ion. The titanium oxide, accordingly, has a high theoretical capacity of about 330 mAh/g, and a reversible capacity of about 240 mAh/g.

When the titanium oxide having a monoclinic β-type structure is used alone as the negative electrode active material, however, adhesion between a negative electrode active material-including layer and a current collector is reduced, and thus the negative electrode active material-including layer is separated from the current collector and excellent cycle characteristics cannot be obtained.

DETAILED DESCRIPTION

According to an embodiment, an electrode including a current collector, a first layer, and a second layer is provided. The first layer is provided on a surface of a current collector, and includes lithium titanium oxide having a spinel structure. The second layer is provided on the first layer, and includes monoclinic β-type titanium composite oxide.

According to an embodiment, a nonaqueous electrolyte battery including a positive electrode, a negative electrode, and a nonaqueous electrolyte is provided. The negative electrode includes the electrode according to the embodiment.

According to a further embodiment, a battery pack including the nonaqueous electrolyte battery according to the embodiment is provided.

Embodiments are explained below referring to the drawings. The same numbers are applied to the common structures throughout the embodiments, and overlapped explanations are omitted. Each drawing is a schematic diagram in order to explain an embodiment and to promote an understanding thereof. Shapes, sizes and ratios in the drawings may sometimes be different from those in a device actually used, but they can be appropriately design-changed considering explanations described below and known techniques.

(First Embodiment)

According to a first embodiment, an electrode includes a current collector and an active material-including layer. The active material-including layer includes a first layer and a second layer. The first layer is formed on both sides or one side of a current collector, and includes lithium titanium oxide having a spinel structure as an active material. The second layer is formed on the first layer, and includes a monoclinic β-type titanium composite oxide as an active material.

The lithium titanium oxide having a spinel structure is preferably represented by $Li_{4+x}Ti_5O_{12}$ (0≤x≤3). As $Li_{4+x}Ti_5O_{12}$ (0≤x≤3) is slightly alkaline, corrosion of a current collector (e.g., a current collector including aluminum) can be inhibited, whereby adhesion between the current collector and the active material can be improved.

The monoclinic β-type titanium composite oxide is desirably a titanium composite oxide having a crystal structure of monoclinic titanium dioxide. The crystal structure of monoclinic titanium dioxide mainly belongs to a space group C2/m, and has a tunnel structure. The crystal structures of the monoclinic titanium dioxide are covered in detail in G. Armstrong, A. R. Armstrong, J. Canales, P. G. Bruce, Electrochem. Solid-State Lett., 9, A139 (2006). When the monoclinic β-type titanium composite oxide is used, a high capacity can be obtained.

The monoclinic β-type titanium composite oxide can be synthesized, for example, by the following method. An alkali titanate compound such as $Na_2Ti_3O_7$, $K_2Ti_4O_9$ or $Cs_2Ti_5O_{11}$ is subjected to proton exchange to exchange an alkali metal of the alkali titanate compound with a proton. The proton-exchanged compound is heated to obtain the monoclinic β-type titanium composite oxide. An alkali metal may sometimes remain in the proton-exchanged compound in the proton exchange. The monoclinic β-type titanium composite oxide, accordingly, allows the inclusion of an alkali metal such as Na, K or Cs. An alkali metal content is, however, preferably low, and the alkali metal content in the monoclinic β-type titanium composite oxide is preferably 2% by mass or less, more preferably 1% by mass or less.

The lithium titanium oxide having a spinel structure and the monoclinic β-type titanium composite oxide may exist in the state of a primary particle in the electrode, or can exist in the state of a secondary aggregate in the electrode. It is desirable that the particles of the lithium titanium oxide having a spinel structure are in the state of a primary particle, and the particles of the monoclinic β-type titanium composite oxide are in the state of a secondary aggregate.

The second layer may further include an anatase type titanium composite oxide.

The first layer and the second layer desirably satisfy the following formula (1):

$$0 < (F_1/F_2) \leq 1.5 \quad (1)$$

wherein $F_1$ is a frequency of peaks in a frequency distribution of particle size of the lithium titanium oxide having a spinel structure in the first layer; and $F_2$ is a frequency of peaks in a frequency distribution of particle size of the monoclinic (β-type titanium composite oxide in the second layer.

When the first and second layers satisfy the formula (1), permeability of an electrolytic solution to the first and second layers is made satisfactory, thus resulting in realization of sufficient permeation of the electrolytic solution up to the first layer, which is brought into contact with the current collector. As a result, diffusion of lithium ions can be made satisfactory in the first layer and the second layer, and thus the rate performance of the nonaqueous electrolyte battery can be improved. A particle size at the peak (hereinafter referred to as a "first mode diameter") in the frequency distribution of the lithium titanium oxide particle size in the first layer is preferably smaller than a particle size at the peak (hereinafter referred to as a "second mode diameter") in the frequency distribution of the monoclinic β-type titanium composite oxide particle size in the second layer. The diffusion of the electrolytic solution to the first layer can be promoted by the structure above, and thus the rate performance of the nonaqueous electrolyte battery can be further improved.

A ratio ($F_1/F_2$) can be obtained, for example, from a frequency distribution of particle size, which is obtained from a scanning electron microscope (SEM) photograph of a cross-section of an electrode obtained when it is cut in a thickness direction.

The composition of the active material can be identified, for example, by etching the surface of the active material-including layer to take a part of it, and then performing an X-ray diffraction (XRD) or a Raman spectroscopy.

It is desirable that the active material-including layer has a density within a range of 2 g/cm³ or more and 2.4 g/cm³ or less. When the density is within this range, the capacity and the rate performance of the nonaqueous electrolyte battery can be improved.

The first layer and the second layer may include materials other than the active material. Examples of such a material include a conducting agent and a binding agent.

The conducting agent is added for increasing a current collection property and for suppressing a contact resistance between the active material and the current collector. Examples of the conducting agent may include carbonaceous materials such as acetylene black, carbon black or graphite.

The binding agent is added for filling gaps between the dispersed active materials and for binding the active material to the current collector. Examples of the binding agent may include polytetrafluoroethylene (PTFE), polyvinylidene fluoride (PVdF), fluorine-containing rubbers, and styrene-butadiene rubbers.

In the first layer and the second layer, the active material, the conducting agent, and the binding agent are preferably included in a content of 70% by mass or more and 96% by mass or less, 2% by mass or more and 28% by mass or less, and 2% by mass or more and 28% by mass or less, respectively. When the content of the conducting agent is 2% by mass or more, the current collection property of the negative electrode active material-including layer can be improved. When the content of the binding agent is 2% by mass or more, it can be expected to obtain a sufficient binding property of the negative electrode active material-including layer to the current collector and the excellent cycle characteristics. On the other hand, it is preferable that the contents of the conducting agent and the binding agent are controlled to 28% by mass or less, to make the capacity higher.

It is desirable that the current collector is formed from a material electrochemically stable in a potential range nobler than 1.0 V (vs. Li/Li⁺). Examples of such a material may include aluminum, and aluminum alloy including at least one element selected from the group consisting of Mg, Ti, Zn, Mn, Fe, Cu and Si. The current collector can be formed into a sheet shape such as a metal foil.

The electrode can be produced, for example, by the following method. First, the lithium titanium oxide having a spinel structure, the conducting agent, and the binding agent are dispersed in a solvent to prepare a first slurry. The first slurry is coated on one side or both sides of the current collector, which is dried to form the first layer. Subsequently, the monoclinic β-type titanium composite oxide, the conducting agent, and the binding agent are dispersed in a solvent to prepare a second slurry. The second slurry is coated on the first layer, which is dried to form the second layer. After that, the resulting product is pressed to obtain the electrode. Additionally, cutting may be performed before or after the press if necessary.

Figure 1:
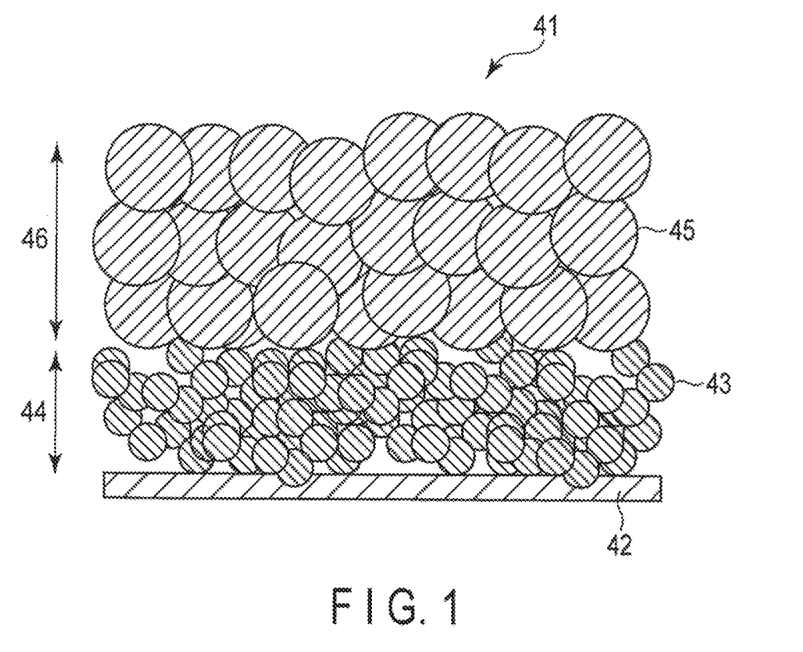
FIG. 1 is a schematic diagram showing an electrode according to a first embodiment.

FIG. 1 is a schematic diagram showing the electrode of the first embodiment. As shown in FIG. 1, an electrode 41 includes a current collector 42 having a sheet shape; a first layer 44, which is formed on at least one surface of the current collector 42 and includes particles 43 of lithium titanium oxide having a spinel structure; and a second layer 46, which is formed on the first layer 44 and includes particles 45 of monoclinic β-type titanium composite oxide.

The electrode according to the first embodiment explained above includes the first layer, which is formed on the surface of the current collector and includes the lithium titanium oxide having a spinel structure, and the second layer which is formed on the first layer and includes the monoclinic β-type titanium composite oxide. The first layer has more excellent adhesion to the current collector than the second layer, and thus it is difficult to peel from the current collector even if the potential number of the charge/discharge cycle is exceeded. When the agitation is strongly performed in the preparation of the slurry, a good performance can be easily obtained in the lithium titanium oxide having a spinel structure, but if the same agitation as above is applied to the slurry including the monoclinic β-type titanium composite oxide, the performance is deteriorated. The lithium titanium oxide having a spinel structure and the monoclinic β-type titanium composite oxide are, accordingly, separated into different layers, whereby an optimum preparation method of the slurry can be selected for each active material. As a result, both the characteristic of the spinel structure lithium titanium oxide, which is excellent rate performance, and the characteristic of the monoclinic β-type titanium composite oxide, in which the high capacity is obtained, can be utilized, whereby the electrode having the high capacity, and the long cycle life and excellent rate performance can be realized.

(Second Embodiment)

According to a second embodiment, a nonaqueous electrolyte battery including a positive electrode, a negative electrode, and a nonaqueous electrolyte is provided. The electrode of the first embodiment is used as the negative electrode. The nonaqueous electrolyte battery may further include a separator disposed between the positive electrode and the negative electrode, and a case housing the positive electrode, the separator, the negative electrode, and the nonaqueous electrolyte. The positive electrode, the nonaqueous electrolyte, the separator, and the case are explained below.

(Positive Electrode)

The positive electrode includes a positive electrode current collector and a positive electrode active material-including layer. The positive electrode active material-including layer includes a positive electrode active material, a conducting agent, and a binding agent. The positive electrode active material-including layer is provided on one side or both sides of the positive electrode current collector.

Various oxides, sulfides or polymers may be used as the positive electrode active material.

Examples of the oxide may include manganese dioxide ($MnO_2$) being capable of absorbing lithium, iron oxide being capable of absorbing lithium, copper oxide being capable of absorbing lithium, nickel oxide being capable of absorbing lithium, lithium manganese composite oxide (e.g., $Li_xMn_2O_4$ or $Li_xMnO_2$ ($0<x\leq1$)), lithium nickel composite oxide (e.g., $Li_xNiO_2$ ($0<x\leq1$)), lithium cobalt composite oxide (e.g., $Li_xCoO_2$ ($0<x\leq1$)), lithium nickel cobalt composite oxide (e.g., $Li_xNi_{1-y}Co_yO_2$ ($0<x\leq1$ and $0<y<1$)), lithium manganese cobalt composite oxide (e.g., $Li_xMn_yCo_{1-y}O_2$ ($0<x\leq1$ and $0<y\leq1$)), lithium nickel cobalt manganese composite oxide (e.g., $Li_xNi_{1-y-z}Co_yMn_zO_2$ ($0\leq x\leq1$, $0<y<1$ and $0<z<1$)), lithium nickel cobalt aluminum composite oxide (e.g., $Li_xNi_{1-y-x}Co_yAl_zO_2$ ($0<x\leq1$, $0<y<1$ and $0<z<1$)), lithium manganese nickel composite oxide having a spinel structure (e.g., $Li_xMn_{2-y}NiO_4$ ($0<x\leq1$ and $0<y\leq1$)), lithium phosphorus oxide having an olivine structure (e.g., $Li_xFePO_4$ ($0<x\leq1$), $Li_xFe_{1-y}Mn_yPO_4$ ($0\leq x\leq1$ and $0<y<1$), $LixCoPO4$ ($0<x\leq1$)), ferric sulfate ($Fe_2(SO_4)_3$), and vanadium oxide (e.g., $V_2O_5$). These compounds may be used alone or as a mixture of multiple compounds thereof as the active material.

In addition, conductive polymer materials such as polyaniline or polypyrrole, and organic materials and inorganic materials such as disulfide polymer materials, sulfur (S), or fluorinated carbon may also be used as the positive electrode active material.

The compounds described above may be used alone or as a mixture thereof for the positive electrode active material.

Active materials from which a high positive electrode potential can be obtained are preferable. Examples thereof may include lithium manganese composite oxide ($Li_xMn_2O_4$), lithium manganese nickel composite oxide having a spinel structure ($Li_xMn_{2-y}Ni_yO_4$), lithium nickel composite oxide ($Li_xNiO_2$), lithium cobalt composite oxide ($Li_xCoO_2$), lithium nickel cobalt composite oxide ($Li_xNi_{1-y}Co_yO_2$), lithium manganese cobalt composite oxide ($Li_xMn_yCo_{1-y}O_2$), lithium nickel cobalt manganese composite oxide (e.g., $Li_xNi_{1-y-z}Co_yMn_zO_2$) and lithium iron phosphate ($Li_xFePO_4$).

The conducting agent improves the current collection property and suppresses the contact resistance of the active material to the current collector. Examples of the conducting agent may include carbonaceous materials such as acetylene black, carbon black, graphite, carbon nanofibers, or carbon nanotubes.

The binding agent binds the active material, the conducting agent, and the current collector. Examples of the binding agent may include polytetrafluoroethylene (PTFE), polyvinylidene fluoride (PVdF), and fluorine-containing rubbers.

It is preferable that the active material, the conducting agent, and the binding agent are included in the positive electrode in contents of 80% by mass or more and 95% by mass or less, 3% by mass or more and 18% by mass or less, and 2% by mass or more and 17% by mass or less, respectively. When the conducting agent is included in a content of 3% by mass or more, the effects described above can be exhibited. When the conducting agent is included in a content of 18% by mass or less, the decomposition of the nonaqueous electrolyte on the surface of the conducting agent can be reduced in storage at high temperature. When the binding agent is included in a content of 2% by mass or more, a satisfactory positive electrode strength can be obtained. When the binding agent is included in a content of 17% by mass or less, the amount of the binding agent, which is an insulting material, in the positive electrode can be reduced, thus resulting in reduction of the internal resistance.

The positive electrode current collector is preferably an aluminum foil or an aluminum alloy foil including one or more elements selected from the group consisting of Mg, Ti, Zn, Mn, Fe, Cu, and Si.

The positive electrode can be produced, for example, by the following method. First, the positive electrode active material, the conducting agent, and the binding agent are dispersed in a solvent to prepare a slurry. This slurry is coated on one side or both sides of the positive electrode current collector, which is dried to form the positive electrode active material-including layer. After that, the resulting product is pressed. Alternatively, the positive electrode active material, the conducting agent, and the binding agent are formed into pellets, and they may also be used as the positive electrode active material-including layer.

(Nonaqueous Electrolyte)

As the nonaqueous electrolyte, a liquid nonaqueous electrolyte or a gelatinous nonaqueous electrolyte may be used. The liquid nonaqueous electrolyte is prepared by dissolving an electrolyte in an organic solvent. The electrolyte has preferably a concentration within a range of 0.5 to 2.5 mol/l. The gelatinous nonaqueous electrolyte is prepared by conjugating liquid electrolyte with a polymer material.

Examples of the electrolyte may include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), or lithium bistrifluoromethylsulfonyl imide[$LiN(CF_3SO_2)_2$]. These electrolytes may be used alone or as a mixture of two or more kinds. The electrolyte includes preferably $LiN(CF_3SO_2)_2$.

Examples of the organic solvent may include cyclic carbonates such as propylene carbonate (PC), ethylene carbonate (EC), or vinylene carbonate; linear carbonates such as diethyl carbonate (DEC), dimethyl carbonate (DMC), or methylethyl carbonate (MEC); cyclic ethers such as tetrahydrofuran (THF), 2-methyltetrahydrofuran (2MeTHF), or dioxolane (DOX); linear ethers such as dimethoxyethane (DME) or diethoxyethane (DEE); γ-butyrolactone (GBL), acetonitrile (AN), and sulfolane (SL). These organic solvents may be used alone or as a mixture of two or more kinds.

More preferable examples of the organic solvent may include mixed solvents including two or more solvents selected from the group consisting of propylene carbonate (PC), ethylene carbonate (EC), diethyl carbonate (DEC), dimethyl carbonate (DMC) and methylethyl carbonate (MEC), and mixed solvents including γ-butyrolactone (GBL). When such a mixed solvent is used, the nonaqueous electrolyte battery having excellent low-temperature properties can be obtained.

Examples of the polymer material may include polyvinylidene fluoride (PVdF), polyacrylonitrile (PAN), and polyethylene oxide (PEO).

(Separator)

As the separator, for example, porous films and synthetic resin non-woven fabrics, which are formed from materials such as polyethylene, polypropylene, cellulose or polyvinylidene fluoride (PVdF) may be used. Of these, the porous films containing polyethylene or polypropylene are preferable, because they can melt at a certain temperature and disconnect a current and also they can improve safety.

(Case)

As the case, a bag-shaped container made of a laminated film or a metal container may be used.

Examples of the shape thereof may include a flat shape, a rectangle shape, a cylindrical shape, a coin shape, a button shape, a sheet shape, a laminate shape, and the like. In addition to compact batteries, which are carried on portable electronic devices, large-sized batteries, which are carried on automobiles of two- to four-wheeled vehicles, may be used.

As the laminated film, a multilayer film in which a metal layer is put between resin films is used. The metal layer is preferably an aluminum foil or an aluminum alloy foil, for weight saving. As the resin film, for example, a polymer material such as polypropylene (PP), polyethylene (PE), nylon, or polyethylene terephthalate (PET) may be used. The laminated film is subjected to thermofusion to seal it, whereby a case can be formed. The laminate film has preferably a thickness of 0.2 mm or less.

The metal container can be formed from aluminum or aluminum alloy. The aluminum alloy includes preferably an element such as magnesium, zinc, or silicon. On the other hand, a content of a transition metal such as iron, copper, nickel or chromium is preferably 100 ppm or less. This can dramatically improve the long term reliability under a high temperature environment and the heat dissipation. The metal container has preferably a thickness of 0.5 mm or less, more preferably 0.2 mm or less.

Figure 2:
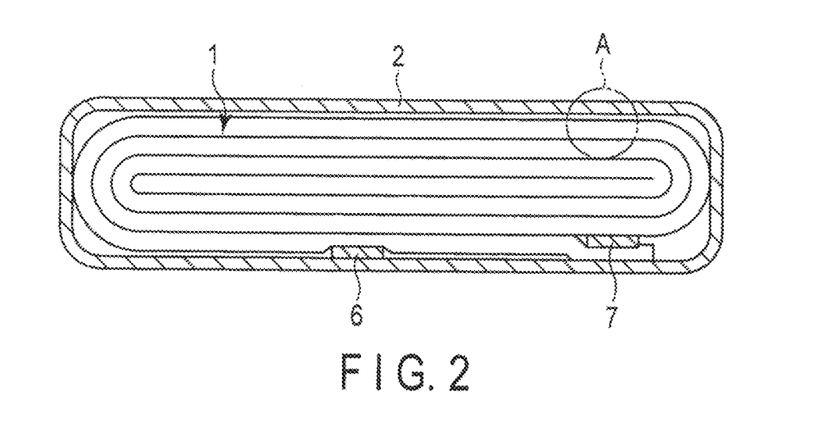
FIG. 2 is a cross-sectional view showing a nonaqueous electrolyte battery according to a second embodiment.
Figure 3:
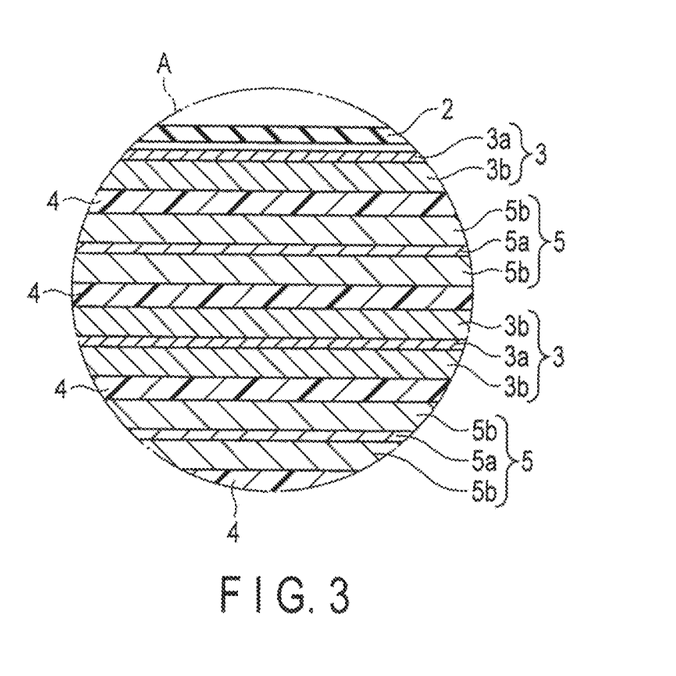
FIG. 3 is an enlarged cross-sectional view showing a part A in FIG. 2.

The nonaqueous electrolyte battery according to the embodiment will be explained in more detail with reference to the drawings. FIG. 2 is a sectional view of a flat type nonaqueous electrolyte secondary battery. FIG. 3 is an enlarged sectional view of the A part of FIG. 2. The flat type nonaqueous electrolyte secondary battery includes a flat type coil electrode group 1, case 2, positive electrode terminal 7, negative electrode terminal 6 and nonaqueous electrolyte.

The flat type coil electrode group 1 is accommodated in a baggy case 2 made of a laminate film obtained by interposing a metal layer between two resin layers. The coil electrode group 1 having a flat form is formed by spirally coiling a laminate obtained by laminating a negative electrode 3, a separator 4, a positive electrode 5 and a separator 4 in this order from the outside and by press-molding the coiled laminate.

The negative electrode 3 includes a negative electrode current collector 3a and a negative electrode active material-containing layer 3b. The above negative electrode active material is contained in the negative electrode active material-containing layer 3b. The outermost negative electrode 3 has a structure in which as shown in FIG. 3, a negative electrode active material-containing layer 3b is formed on only one of the inside surfaces of the negative electrode current collector 3a. Other negative electrodes 3 each have a structure in which a negative electrode active material-containing layer 3b is formed on each surface of the negative electrode current collector 3a. In the positive electrode 5, a positive electrode active material-containing layer 5b is formed on each surface of the positive electrode current collector 5a.

As shown in FIG. 2, the negative electrode terminal 6 is connected to the negative electrode current collector 3a of the outermost negative electrode 3 and the positive electrode terminal 7 is connected to the positive electrode current collector 5a of the inside positive electrode 5 in the vicinity of the outer peripheral end of the coil electrode group 1. These negative electrode terminal 6 and positive electrode terminal 7 are externally extended from an opening part of the baggy case 2. A liquid nonaqueous electrolyte is, for example, injected from the opening part of the baggy case 2. The opening part of the baggy case 2 is closed by heat sealing with the negative electrode terminal 6 and positive electrode terminal 7 extended out of the opening part to thereby seal the coil electrode group 1 and liquid nonaqueous electrolyte.

The positive electrode terminal 7 contains a material, which is electrically stable at a potential within range of 3.0 V (vs. $Li/Li^+$) or more and 4.5 V (vs. $Li/Li^+$) or less and has conductivity. It is preferably formed from aluminum, or an aluminum alloy including at least one element selected from the group consisting of Mg, Ti, Zn, Mn, Fe, Cu and Si. In order to reduce the contact resistance with the positive electrode current collector, the positive electrode terminal is preferably formed from the same material as used in the positive electrode current collector.

The negative electrode terminal 6 contains a material, which is electrically stable at a potential within range of 1.0 V (vs. $Li/Li^+$) or more and 3.0 V (vs. $Li/Li^+$) or less and has conductivity. It is preferably formed from aluminum, or an aluminum alloy including at least one element selected from the group consisting of Mg, Ti, Zn, Mn, Fe, Cu and Si. In order to reduce the contact resistance with the negative electrode current collector, the negative electrode terminal is preferably formed from the same material as used in the negative electrode current collector.

According to the nonaqueous electrolyte battery of the second embodiment, it can be suppressed that the negative electrode active material-including layer peels from the current collector, because the electrode of the first embodiment is used as the negative electrode. As a result, both the characteristic of the spinel structure lithium titanium oxide, which is excellent rate performance, and the characteristic of the monoclinic β-type titanium composite oxide, in which the high capacity is obtained, can be sufficiently utilized, whereby the nonaqueous electrolyte battery having the high capacity, and the long cycle life and the excellent rate performance can be realized.

(Third Embodiment)

Next, a battery pack according to a third embodiment will be explained with reference to the drawings. The battery pack according to the third embodiment includes as a unit cell one or two or more of the nonaqueous electrolyte batteries according to the second embodiment and a casing in which the nonaqueous electrolyte battery is accommodated. When the battery pack includes two or more unit cells, these unit cells are disposed in such a manner that they are electrically connected in series or in parallel.

Figure 4:
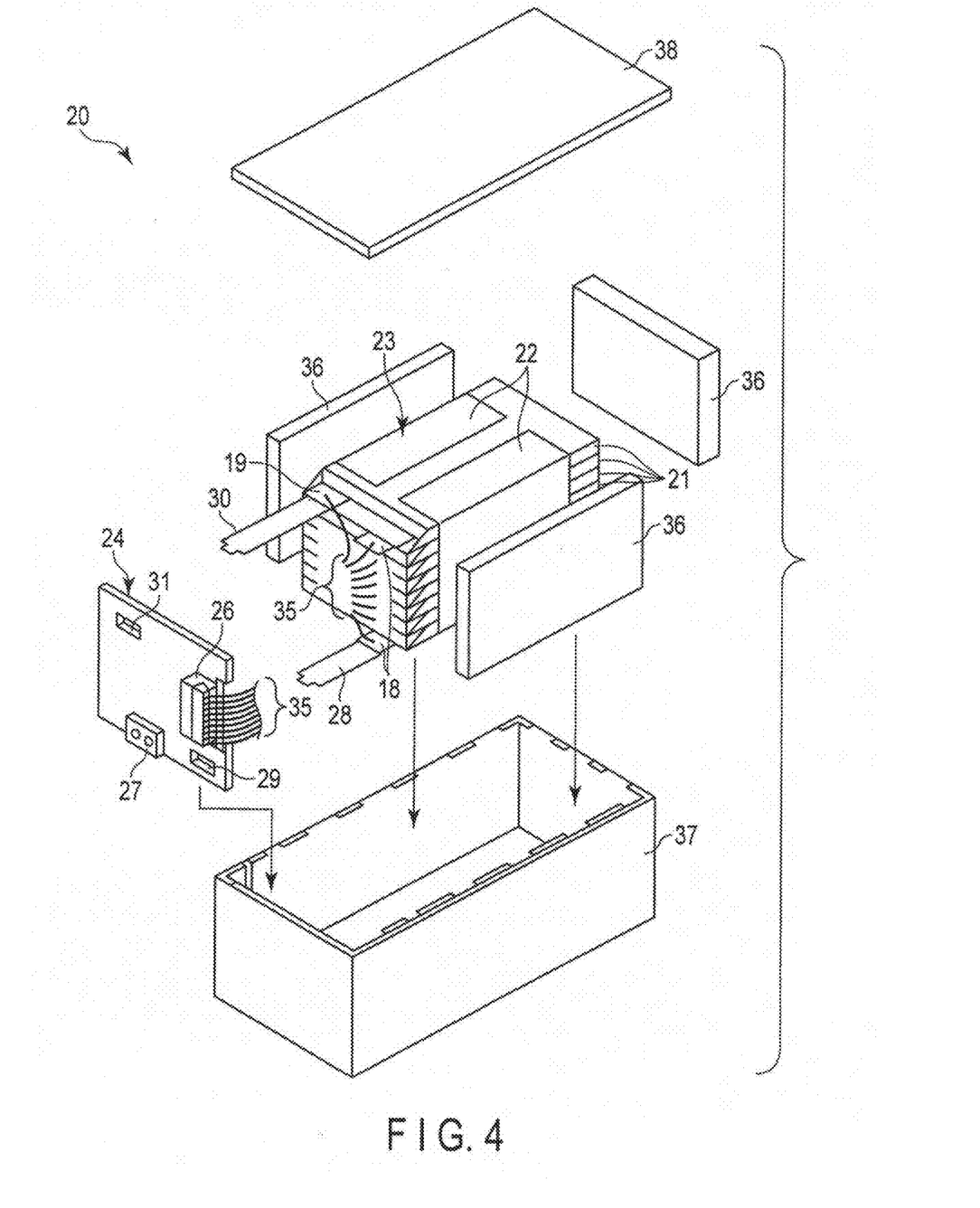
FIG. 4 is an exploded perspective view showing a battery pack according to a third embodiment.
Figure 5:
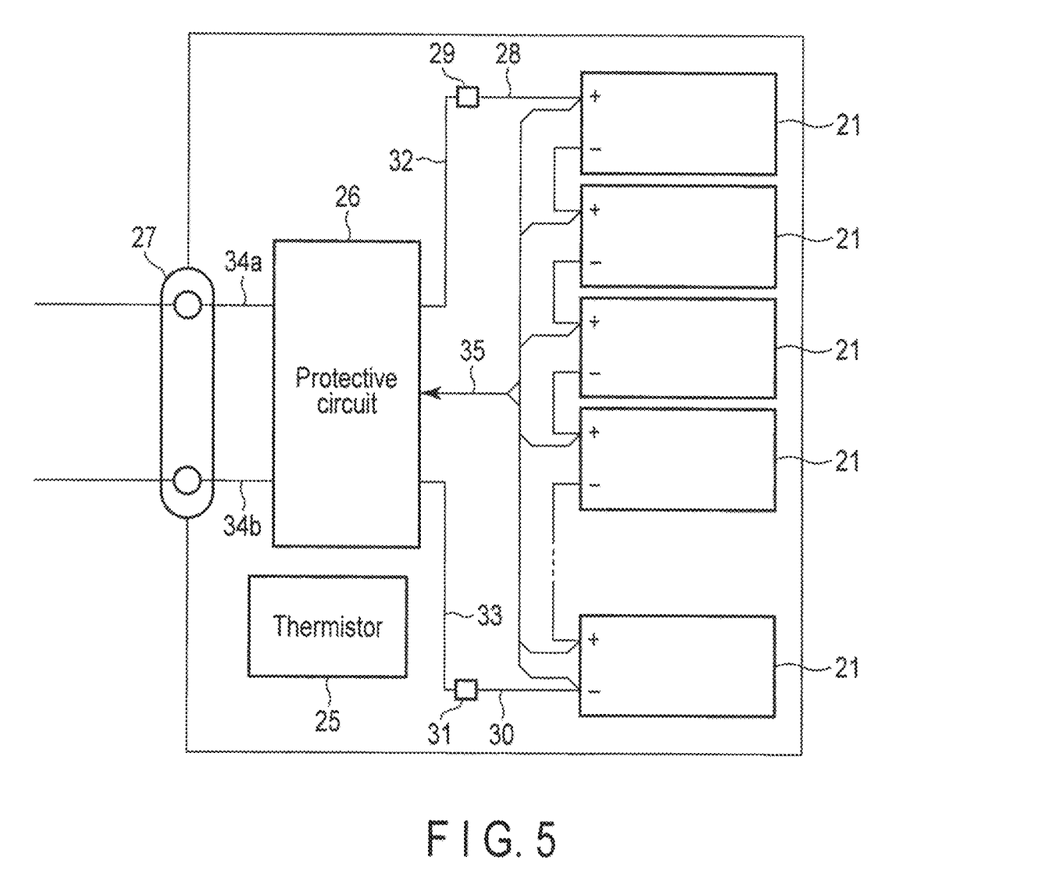
FIG. 5 is a block view showing an electric circuit in the battery pack in FIG. 4.

FIGS. 4 and 5 show an example of a battery pack 20. The battery pack 20 includes a plurality of flat type batteries 21 each having the structure shown in FIG. 2. FIG. 4 is an exploded perspective view of the battery pack 20. FIG. 5 is a block diagram showing an electric circuit of the battery pack 20 shown in FIG. 4.

The plurality of unit cells 21 are laminated such that the externally extended negative electrode terminals 19 and positive electrode terminals 18 are arranged in the same direction and fastened with an adhesive tape 22 to thereby configure a battery module 23. These unit cells 21 are electrically connected in series as shown in FIG. 5.

A print wiring board 24 is disposed opposite to the side surface of the unit cell 21 from which the negative electrode terminal 19 and positive electrode terminal 18 are extended. As shown in FIG. 5, a thermistor 25, a protective circuit 26 and an energizing terminal 27 connected to external devices are mounted on the print wiring board 24. An insulating plate (not shown) is attached to the surface of the print wiring board 24 facing the battery module 23 to avoid unnecessary electrical connection with the wiring of the battery module 23.

A positive electrode lead 28 is connected with the positive electrode terminal 18 positioned on the lowermost layer of the battery module 23 with its end being inserted into a positive electrode connector 29 of the print wiring board 24 for electrical connection. A negative electrode lead 30 is connected with the negative electrode terminal 19 positioned on the uppermost layer of the battery module 23 with its end being inserted into a negative electrode connector 31 of the print wiring board 24 for electrical connection. These connectors 29 and 31 are connected to a protective circuit 26 through wirings 32 and 33 formed on the print wiring board 24.

The thermistor 25 is used to detect the temperature of the unit cell 21 and the detected signals are transmitted to the protective circuit 26. The protective circuit 26 can shut off a plus wiring 34a and minus wiring 34b between the protective circuit 26 and the energizing terminal 27 connected to external devices in a predetermined condition. The predetermined condition means, for example, the case where the temperature detected by the thermistor 25 is above a predetermined one. Also, the predetermined condition means, for example, the case of detecting overcharge, overdischarge and over-current of the unit cell 21. The detections of this overcharge and the like are made for individual unit cells 21 or battery module 23. When individual unit cells 21 are detected, either the voltage of the battery may be detected or the potential of the positive electrode or negative electrode may be detected. In the latter case, a lithium electrode used as a reference electrode is inserted between individual unit cells 21. In the case of FIGS. 4 and 5, a wiring 35 for detecting voltage is connected to each unit cell 21 and the detected signals are transmitted to the protective circuit 26 through these wirings 35.

A protective sheet 36 made of a rubber or resin is disposed on each of the three side surfaces of the battery module 23 excluding the side surface from which the positive electrode terminal 7 and negative electrode terminal 6 are projected.

The battery module 23 is accommodated in a container 37 together with each protective sheet 36 and print wiring board 24. Specifically, the protective sheet 36 is disposed on each inside surface in the direction of the long side and on one of the inside surfaces in the direction of the short side of the container 37, and the print wiring board 24 is disposed on the opposite inside surface in the direction of the short side. The battery module 23 is positioned in a space enclosed by the protective sheet 36 and the print wiring board 24. A lid 38 is attached to the upper surface of the container 37.

Here, a thermally contracting tape may be used in place of the adhesive tape 22 to secure the battery module 23. In this case, after the protective sheet is disposed on both sides of the battery module and the thermally contracting tapes are wound around the battery module, the thermally contracting tape is contracted by heating to fasten the battery module.

The structure in which the unit cells 21 are connected in series is shown in FIG. 4 and FIG. 5. However, these unit cells 21 may be connected in series to increase the capacity of the battery. Or, series cell connection and parallel cell connections may be combined. Also, the battery packs may be further connected in series or parallel.

Also, the embodiments of the battery pack are appropriately changed according to its use. The battery pack is preferably used in applications required to exhibit excellent cycle performance at a large current. Specifically, the battery pack is used as power sources for digital cameras, and batteries mounted on vehicles such as two- to four-wheel hybrid electric cars, two- to four-wheel electric cars, or assist bicycles. The battery pack is preferably used for batteries mounted on vehicles.

According to the third embodiment, the nonaqueous electrolyte battery of the second embodiment is included and therefore, a battery pack having the high capacity, and the long cycle life and excellent rate performance can be realized.

Examples are explained below.

EXAMPLE

<Production of Positive Electrode>

As a positive electrode active material, 90% by mass of a lithium nickel composite oxide ($LiNi_{0.8}Co_{0.1}Mn_{0.1}O_2$) powder was used. As a conducting agent, 3% by mass of acetylene black and 3% by mass of graphite were used. As a binding agent, 4% by mass of polyvinylidene fluoride (PVdF) was used. The components described above were added to N-methylpyrrolidone (NMP), which was mixed to prepare a slurry. This slurry was coated on both sides of a current collector of aluminum foil having a thickness of 12 μm, which was dried and pressed to obtain a positive electrode.

<Production of Negative Electrode>

Fifty parts by mass of a lithium titanium oxide ($Li_4Ti_5O_{12}$) powder having a spinel structure (an average particle size of 1 μm), 10 parts by mass of graphite as a conducting agent, and 10 parts by mass of polyvinylidene fluoride (PVdF) as a binding agent were used. These components were mixed with N-methylpyrrolidone (NMP) to prepare a first slurry.

Fifty parts by mass of a monoclinic β-type titanium dioxide powder having a $TiO_2$ (B) crystal structure (an average particle size of 12 μm), 10 parts by mass of graphite as a conducting agent, and 10 parts by mass of polyvinylidene fluoride (PVdF) as a binding agent were used. These components were mixed with N-methyl pyrrolidone (NMP) to prepare a second slurry.

The obtained first slurry was coated on both sides of a current collector formed of an aluminum foil having a thickness of 12 μm, which was dried, and then roll-pressed to form a first layer having a coating weight of 50 g/m².

Next, the second slurry was coated on the first layer, which was dried and then roll-pressed to form a second layer having a coating weight of 50 g/m², thereby obtaining a negative electrode including the first layer and the second layer and having a density of the negative electrode active material-including layer of 2.2 g/cm³.

<Production Of Electrode Group>

After the positive electrode, a separator of a porous polyethylene film having a thickness of 20 μm, the negative electrode and the separator were laminated in this order, the laminate was spirally wound, and the wound laminate was heat-pressed at 90° C. to produce a flat electrode group having a width of 33 mm and a thickness of 3.0 mm. The obtained electrode group was housed in a pack formed from a laminate film having a thickness of 0.1 mm, which was dried in vacuo at 80° C. for 24 hours.

<Preparation of Liquid Nonaqueous Electrolyte>

One mol/L of $LiPF_6$ was dissolved as an electrolyte in a mixed solvent of ethylene carbonate (EC) and diethyl carbonate (DEC) in a volume ratio of 1:2 to prepare a liquid nonaqueous electrolyte.

After the liquid nonaqueous electrolyte was poured into the laminate film pack in which the electrode group is housed, the pack was sealed by heat-sealing to produce a nonaqueous electrolyte battery having a structure shown in FIG. 2 and having a width of 35 mm, a thickness of 3.2 mm and a height of 65 mm.

COMPARATIVE EXAMPLE 1

A negative electrode was produced in the same manner as in the Example, except that the second layers were formed on both sides of the current collector and the first layer was formed on the second layer. A nonaqueous electrolyte battery was produced in the same manner as in the Example except that the negative electrode produced above was used.

COMPARATIVE EXAMPLE 2

Fifty parts by mass of a lithium titanium oxide ($Li_4Ti_5O_{12}$) powder having a spinel structure which is the same kind as that used in the Example, 50 parts by mass of a monoclinic β-type titanium dioxide powder having a $TiO_2$ (B) crystal structure which is the same kind as that used in the Example, 10 parts by mass of graphite as a conducting agent, and 10 parts by mass of polyvinylidene fluoride (PVdF) as a binding agent were used. These components were mixed with N-methylpyrrolidone (NMP) to prepare a slurry.

The obtained slurry was coated on both sides of a current collector formed of an aluminum foil which is the same kind as that used in the Example, which was dried and then roll-pressed to form an active material-including layer having a coating weight of 100 g/m$^2$, thereby obtaining a negative electrode.

A nonaqueous electrolyte battery was produced in the same manner as in the Example except that the negative electrode produced above was used.

COMPARATIVE EXAMPLE 3

One hundred parts by mass of a monoclinic β-type titanium dioxide powder having a $TiO_2$ (B) crystal structure which is the same kind as that used in the Example, 10 parts by mass of graphite as a conducting agent, and 10 parts by mass of polyvinylidene fluoride (PVdF) as a binding agent were used. These components were mixed with N-methylpyrrolidone (NMP) to prepare a slurry.

The obtained slurry was coated on both sides of a current collector formed of an aluminum foil which is the same kind as that used in the Example, which was dried and then roll-pressed to form an active material-including layer having a coating weight of 100 g/m$^2$ thereby obtaining a negative electrode.

A nonaqueous electrolyte battery was produced in the same manner as in the Example except that the negative electrode produced above was used.

COMPARATIVE EXAMPLE 4

One hundred parts by mass of a lithium titanium oxide ($Li_4Ti_5O_{12}$) powder having a spinel structure which is the same kind as that used in the Example, 10 parts by mass of graphite as a conducting agent, and 10 parts by mass of polyvinylidene fluoride (PVdF) as a binding agent were used. These components were mixed with N-methyl pyrrolidone (NMP) to prepare a slurry.

The obtained slurry was coated on both sides of a current collector formed of an aluminum foil which is the same kind as that used in the Example, which was dried and then roll-pressed to form an active material-including layer having a coating weight of 100 g/m$^2$, thereby obtaining a negative electrode.

A nonaqueous electrolyte battery was produced in the same manner as in the Example except that the negative electrode produced above was used.

A discharge capacity test, a rate performance test, and a charge/discharge cycle test were performed for the batteries obtained in the Example and Comparative Examples 1 to 4 under conditions described below.

(Discharge Capacity Test)

Figure 6:
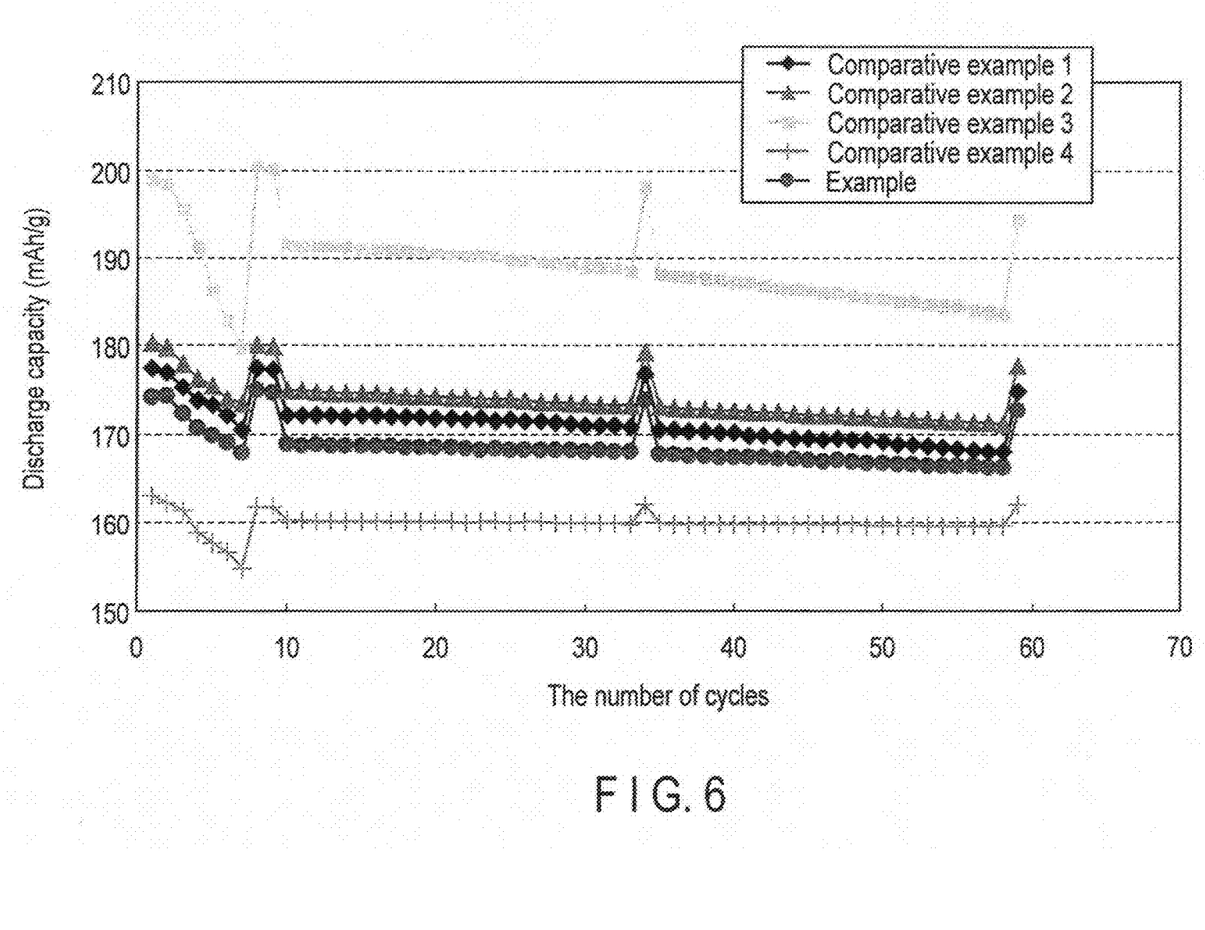
FIG. 6 is a graph showing a relationship between the number of charge/discharge cycles and a discharge capacity in batteries of an Example and Comparative Examples 1 to 4.

One cycle, in which a constant voltage and constant current charge was performed at a current of 1 C and a voltage of 2.8 V for 3 hours in a 25° C. environment and discharge was performed at a current of 1 C to a cut-off voltage of 1.5 V in a 25° C. environment, was repeated, and a discharge capacity (mAh/g) was measured in each cycle. The results are shown in FIG. 6.

(Rate Performance Test)

A constant voltage and constant current charge was performed at a current of 0.1 C and a voltage of 2.8 V for 3 hours in a 25° C. environment, and then discharge was performed at a current of 0.1 C to a cut-off voltage of 1.5 V in a 25° C. environment, whereby a discharge capacity at 0.1 C was measured. In addition, a discharge capacity at each rate of 1 C, 2 C, 3 C, 4 C, or 5 C was measured by changing a charge/discharge rate of 0.1 C to 1 C, 2 C, 3 C, 4 C, or 5 C.

Figure 7:
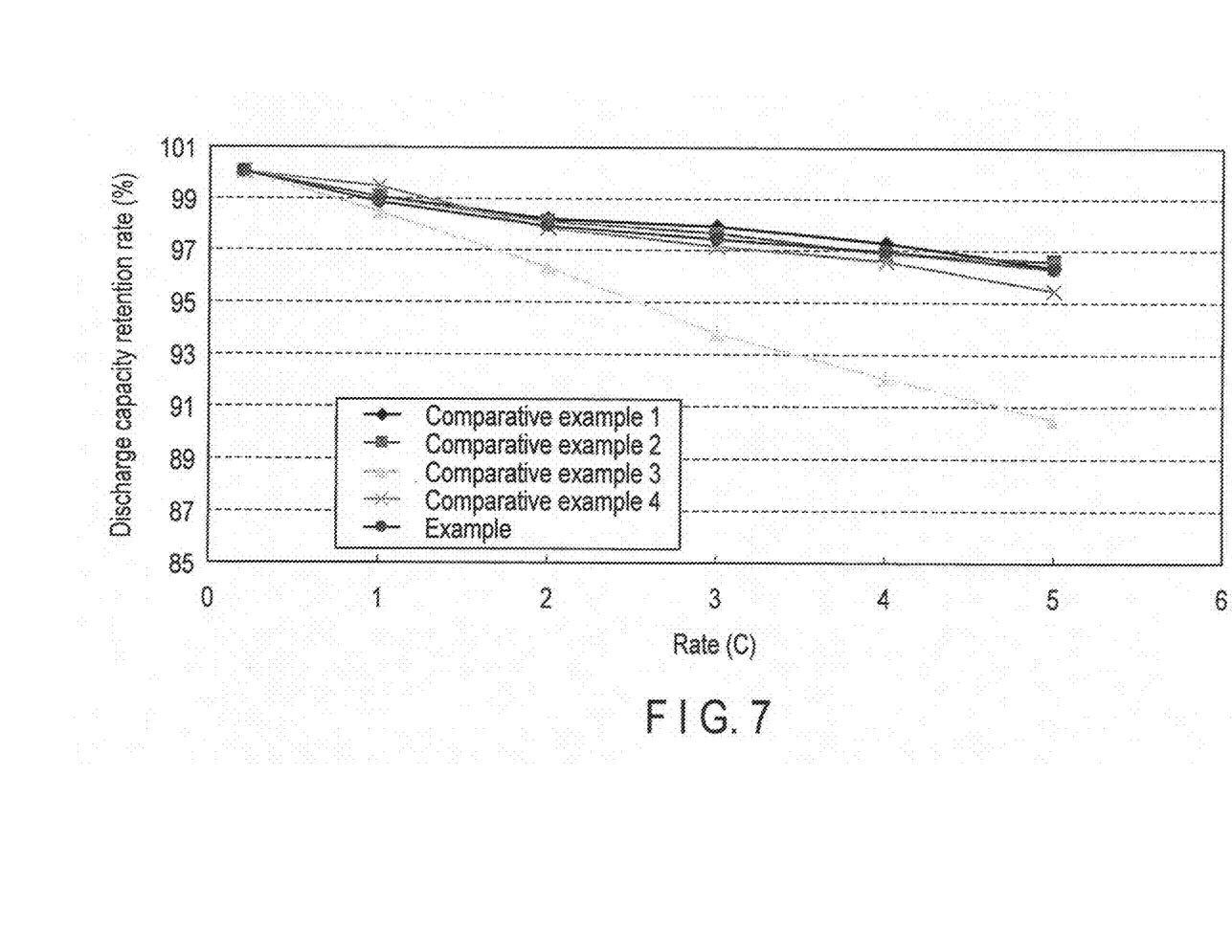
FIG. 7 is a graph showing a relationship between a discharge rate and a discharge capacity retention rate in batteries of the Example and Comparative Examples 1 to 4.

A discharge capacity retention rate (%) was calculated at each rate of 0.1 C, 2 C, 3 C, 4 C, and 5 C when a discharge capacity was assumed as 100% at 1 C in the Example. The results are shown in FIG. 7.

(Charge/Discharge Cycle Test)

A discharge capacity retention rate (%) was measured from the discharge capacity (mAh/g) at each cycle, measured in the discharge capacity test when the discharge capacity (mAh/g) at the first cycle was supposed as 100%. The results are shown in FIG. 8.

As apparent from FIG. 6, the discharge capacity was the highest in Comparative Example 3 in which only $TiO_2$ (B) was used as the active material, and lowered in order of: Comparative Example 2 in which the mixture was used, Comparative Example 1 in which the first and second layers are disposed opposite to those in the Example, the Example, and Comparative Example 4 in which only the lithium titanium oxide having a spinel structure was used as the active material.

As apparent from FIG. 7, the lowering of the discharge capacity retention rate when the charge/discharge rate was increased was the largest in Comparative Example 3, and the discharge capacity retention rate was almost the same in the Example and Comparative Examples 1, 2 and 4.

Figure 8:
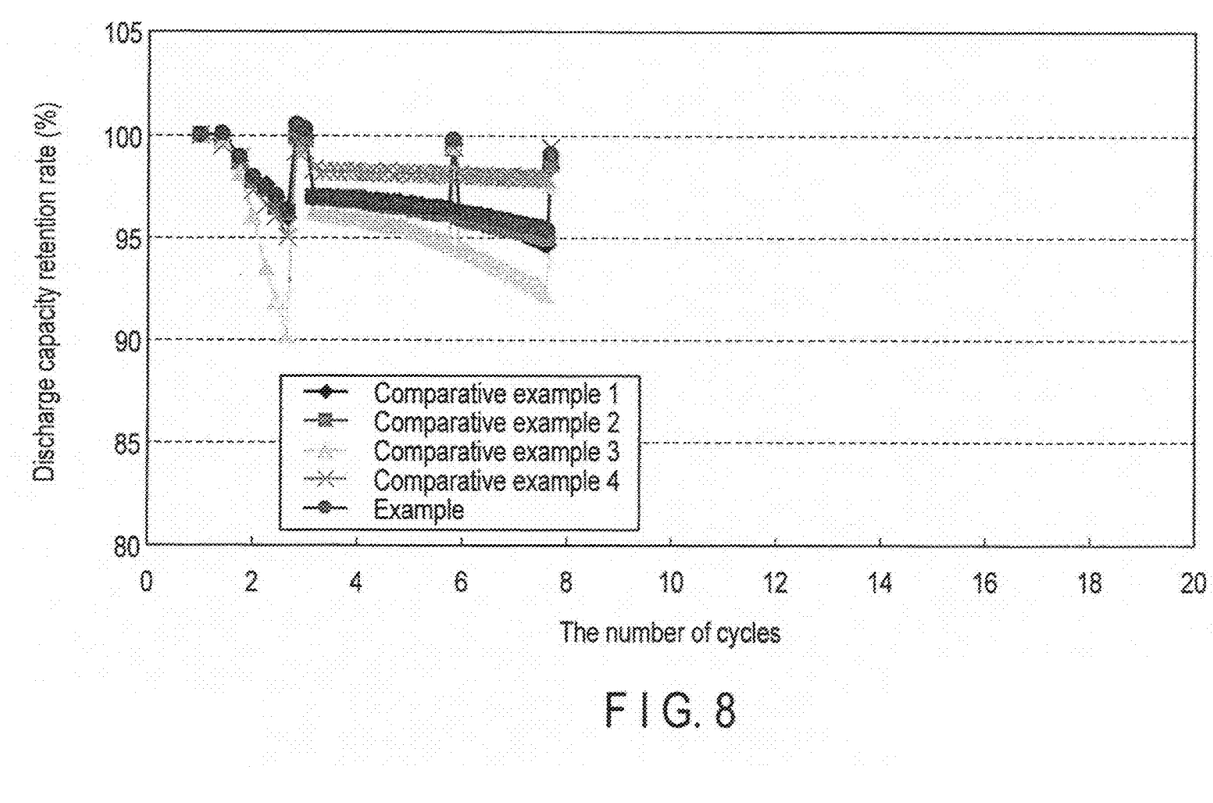
FIG. 8 is a graph showing a relationship between the number of charge/discharge cycles and a discharge capacity retention rate in batteries of the Example and Comparative Examples 1 to 4.

As apparent from FIG. 8, the discharge capacity retention rate in the charge/discharge cycle test was the highest in Comparative Example 4, and lowered in order of the Example, Comparative Example 2, Comparative Example 1, and Comparative Example 3.

Comprehensive evaluations are performed based on the results in FIG. 6 to FIG. 8. In Comparative Example 3 in which only $TiO_2$ (B) is used as the active material, the discharge capacity is excellent, but the rate performance and the charge/discharge cycle performance are poor, and in Comparative Example 4 in which only the lithium titanium oxide having a spinel structure is used as the active material, the charge/discharge cycle performance is excellent, but the discharge capacity is low. On the other hand, in Comparative Example 1 in which the first and second layers are disposed opposite to those in the Example, and Comparative Example 2 in which the mixture was used, the charge/discharge cycle performance is inferior to that in the Example.

On the contrary, according to the Example, while the discharge capacity and the rate performance which compare favorably with those in Comparative Examples 1 and 2 are realized, the charge/discharge cycle performance which is superior to that in Comparative Examples 1 and 2 can be provided.

Figure 9:
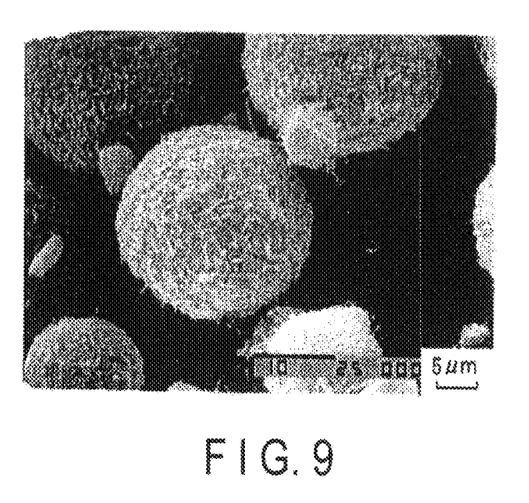
FIG. 9 shows a scanning electron micrograph of a second layer in a negative electrode of the Example.
Figure 10:
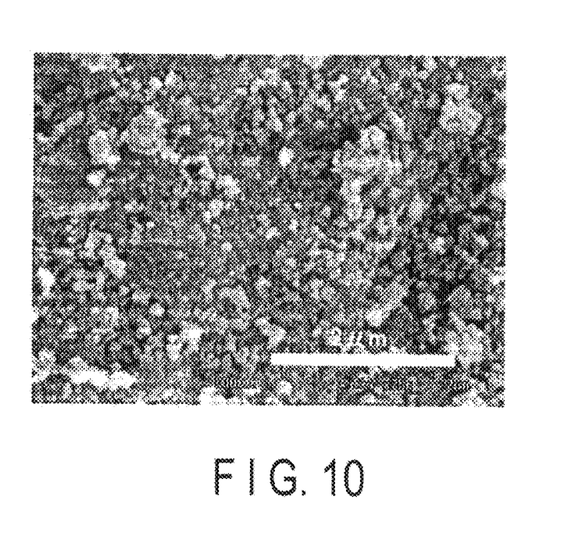
FIG. 10 shows a scanning electron micrograph of a first layer in the negative electrode of the Example.
Figure 11:
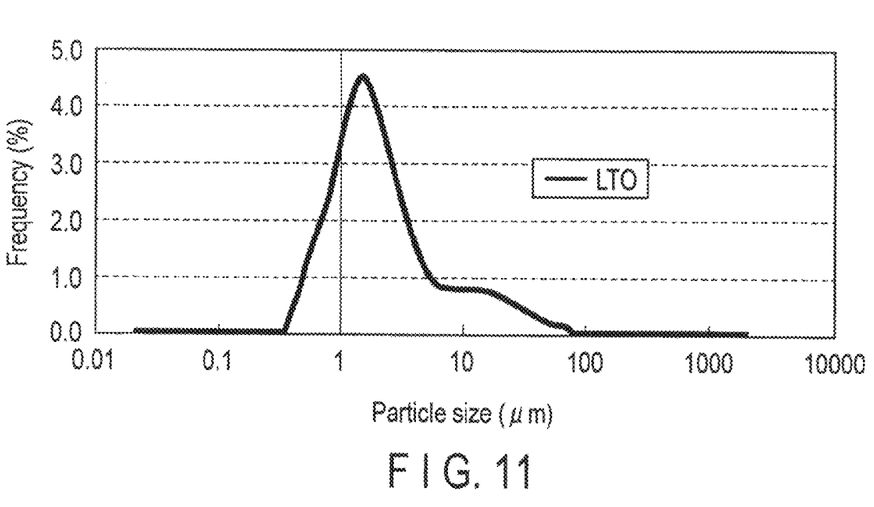
FIG. 11 is a graph showing a frequency distribution of particle size for a negative electrode active material in a first layer in the Example.
Figure 12:
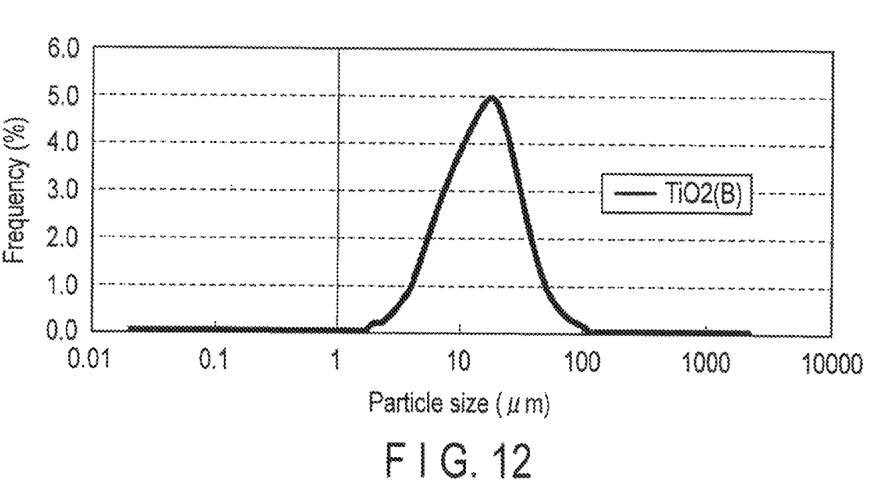
FIG. 12 is a graph showing a frequency distribution of particle size for a negative electrode active material of a second layer in the Example.

The negative electrode from the Example was cut in the thickness direction to obtain a cross-section, SEM photographs of two parts of the first layer on the cross-section were taken, and SEM photographs of two parts of the second layer on the cross-section were taken. FIG. 9 shows the SEM photograph of one part of the second layer, and FIG. 10 shows the SEM photograph of one part of the first layer. Frequency distributions of particle size for the negative electrode active material were obtained from the resulting SEM photographs, and FIG. 11 shows the results of the first layer and FIG. 12 shows the results of the second layer. From the frequency distributions of particle size in FIG. 11 and FIG. 12, a first mode diameter was 1 µm, a second mode diameter was 20 µm, a frequency $F_1$ at the peak in the first mode diameter was 0.03, and a frequency $F_2$ at the peak in the second mode diameter was 0.02. ($F_1/F_2$) was, accordingly, 1.5.

From the SEM photographs of FIG. 9 and FIG. 10, it was seen that the $TiO_2$ (B) used in the second layer had second aggregates (FIG. 9), whereas in lithium titanium oxide having a spinel structure used in the first layer (FIG. 10), there were many primary particles which exist independently. When the lithium titanium oxide particles having a spinel structure and the $TiO_2$ (B) particles were stirred together, like in Comparative Example 2, accordingly, the aggregate structure of $TiO_2$ (B) was broken, thus resulting in the poor charge/discharge cycle performance.

As explained above, according to the electrode of the embodiment or Example, because the electrode includes the first layer which is formed on the surface of the current collector and includes the lithium titanium oxide having a spinel structure, and the second layer which is formed on the first layer and includes the monoclinic β-type titanium composite oxide, the electrode can provide the high capacity, and the long cycle life and the excellent rate performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode comprising
a current collector, and
an active material-including layer comprising a first layer which is provided on a surface of the current collector and comprises lithium titanium oxide having a spinel structure, and a second layer which is provided on the first layer and comprises a monoclinic (β-type titanium composite oxide,
wherein said electrode satisfies formula (1):

$$0<(F_1/F_2)\leq 1.5 \quad (1)$$

wherein $F_1$ is a frequency of peak in a frequency distribution of particle size for the lithium titanium oxide in the first layer, and $F_2$ is a frequency of peak in a frequency distribution of particle size for the monoclinic (β-type titanium composite oxide in the second layer.

2. The electrode according to claim 1, wherein the lithium titanium oxide is represented by $Li_{4+x}Ti_5O_{12}(0\leq x\leq 3)$.

3. The electrode according to claim 1, wherein the active material-including layer has a density within a range of 2 to 2.4 g/cm³.

4. The electrode according to claim 1, wherein the second layer further comprises an anatase type titanium composite oxide.

5. A nonaqueous electrolyte battery comprising:
a positive electrode;
a negative electrode comprising
a current collector, and an active material-including layer comprising a first layer which is provided on a surface of the current collector and comprises lithium titanium oxide having a spinel structure, and a second layer which is provided on the first layer and comprises a monoclinic β-type titanium composite oxide; and
a nonaqueous electrolyte
wherein said battery satisfies formula (1):

$$0<(F_1/F_2)\leq 1.5 \quad (1)$$

wherein $F_1$ is a frequency of peak in a frequency distribution of particle size for the lithium titanium oxide in the first layer, and $F_2$ is a frequency of peak in a frequency distribution of particle size for the monoclinic β-type titanium composite oxide in the second layer.

6. The battery according to claim 5, wherein the lithium titanium oxide is represented by $Li_{4+x}Ti_5O_{12}(0\leq x\leq 3)$.

7. The battery according to claim 5, wherein the active material-including layer has a density within a range of 2 to 2.4 g/cm³.

8. The battery according to claim 5, wherein the second layer further comprises an anatase type titanium composite oxide.

9. A battery pack comprising the nonaqueous electrolyte battery according to claim 5.

10. The electrode according to claim 1, wherein the monoclinic (β-type titanium composite oxide is a titanium composite oxide having a crystal structure of monoclinic titanium dioxide.

11. The electrode according to claim 2, wherein the monoclinic (β-type titanium composite oxide is a titanium composite oxide having a crystal structure of monoclinic titanium dioxide.

12. The electrode according to claim 11, wherein the active material-including layer has a density within a range of 2 to 2.4 g/cm³ and the second layer further comprises an anatase type titanium composite oxide.

13. The battery according to claim 5, wherein the monoclinic β-type titanium composite oxide is a titanium composite oxide having a crystal structure of monoclinic titanium dioxide.

14. The battery according to claim 6, wherein the monoclinic β-type titanium composite oxide is a titanium composite oxide having a crystal structure of monoclinic titanium dioxide.

15. The battery according to claim 14, wherein the active material-including layer has a density within a range of 2 to 2.4 g/cm$^3$ and the second layer further comprises an anatase type titanium composite oxide.

16. A battery pack comprising the nonaqueous electrolyte battery according to claim 13.

17. A battery pack comprising the nonaqueous electrolyte battery according to claim 14.

18. A battery pack comprising the nonaqueous electrolyte battery according to claim 15.

* * * * *